United States Patent
Yamanaka et al.

(10) Patent No.: US 10,245,919 B2
(45) Date of Patent: Apr. 2, 2019

(54) FORCED COOLING OF VEHICLE AIR-CONDITIONING BLOWER MOTOR WITH AIRFLOW REGULATING RIBS

(71) Applicant: Valeo Japan Co., Ltd., Saitama (JP)

(72) Inventors: Mitsunobu Yamanaka, Saitama (JP); Kazuo Oshima, Saitama (JP)

(73) Assignee: Valeo Japan Co., Ltd., Saitama (JP)

( * ) Notice: Subject to any disclaimer, the term of this patent is extended or adjusted under 35 U.S.C. 154(b) by 413 days.

(21) Appl. No.: 15/007,418

(22) Filed: Jan. 27, 2016

(65) Prior Publication Data

US 2016/0229262 A1    Aug. 11, 2016

(30) Foreign Application Priority Data

Feb. 5, 2015    (JP) ................. 2015-021404

(51) Int. Cl.
| | |
|---|---|
| *B60H 1/00* | (2006.01) |
| *F04D 29/42* | (2006.01) |
| *F04D 29/66* | (2006.01) |
| *F04D 29/28* | (2006.01) |
| *F04D 29/44* | (2006.01) |

(52) U.S. Cl.
CPC ...... *B60H 1/00521* (2013.01); *B60H 1/00021* (2013.01); *B60H 1/00507* (2013.01); *B60H 1/00514* (2013.01); *B60H 1/00528* (2013.01); *B60H 1/00564* (2013.01); *F04D 29/282* (2013.01); *F04D 29/422* (2013.01); *F04D 29/4226* (2013.01); *F04D 29/444* (2013.01); *F04D 29/667* (2013.01); *B60H 2001/006* (2013.01); *B60H 2001/00085* (2013.01); *B60H 2001/00092* (2013.01)

(58) Field of Classification Search
CPC ............ B60H 1/00521; B60H 1/00021; B60H 1/00507; B60H 1/00514; B60H 1/00528; B60H 1/00564; B60H 2001/00085; B60H 2001/00092; B60H 2001/006; B60H 2001/003; F04D 29/282; F04D 29/422; F04D 29/4226; F04D 29/444; F04D 29/667
See application file for complete search history.

(56) References Cited

U.S. PATENT DOCUMENTS

| | | | |
|---|---|---|---|
| 2010/0074743 A1* | 3/2010 | Jairazbhoy | F03D 3/04 415/208.1 |
| 2012/0168117 A1* | 7/2012 | Jairazbhoy | B60H 1/00028 165/48.1 |

FOREIGN PATENT DOCUMENTS

JP    S63-37311 U    3/1988

\* cited by examiner

*Primary Examiner* — Travis C Ruby
(74) *Attorney, Agent, or Firm* — Osha Liang LLP

(57) ABSTRACT

A vehicle air-conditioning apparatus that includes a blower unit including a scroll casing including a first wall having an intake port, a second wall opposing the first wall, and a peripheral wall, and an impeller. The apparatus further includes a motor of the impeller, a blow-out flow channel, and a motor cooling air introduction chamber. The motor cooling air introduction chamber is in communication with the blow-out flow channel via an air intake port opening in the peripheral wall of a tongue portion facing the blow-out flow channel at a position more closer to the first wall side than an inner wall surface of the second wall. At least one airflow regulating rib facing the peripheral wall provided with the air intake port is provided, and the airflow regulating rib projects from the inner wall surface of the second wall and having a top portion in the blow-out flow channel.

8 Claims, 7 Drawing Sheets

FORCED COOLING OF VEHICLE AIR-CONDITIONING BLOWER MOTOR WITH AIRFLOW REGULATING RIBS

BACKGROUND OF THE INVENTION

1. Field of the Invention

The present invention relates to a vehicle air-conditioning apparatus and to a vehicle air-conditioning apparatus in which measures to reduce noise at a blower unit is taken.

2. Related Art

In the related art, a vehicle air-conditioning apparatus employs a cooling structure for a motor that drives a blower. The cooling structure is configured to take air from an air intake port provided on a peripheral wall of a tongue portion of a scroll casing at a position facing a blow-out flow channel, and introduce the taken air into an interior of a motor and returning the air into the interior of the blower, and is called a "forced cooling structure" (for example, see Patent Literature 1).

Patent Literature 1: JP-U S63-37311

In recent years, a distance from a blow-out port of a scroll casing to a heat exchanger for cooling tends to be reduced by request of a reduction in size of a vehicle air-conditioning apparatus. The vehicle air-conditioning apparatus as described above reduced in size has a problem of difficulty in supplying blown air to a portion of the heat exchanger for cooling far from the blow-out port of the scroll casing. When the forced cooling structure is employed in such a circumstances, since air flowing in a blow-out flow channel tends to be taken from the blow-out flow channel having a high static pressure to the interior of the motor having a low static pressure, a quantity of air supplied to a portion of the heat exchanger for cooling far from the blow-out port of the scroll casing is further reduced.

SUMMARY

It is an object of the invention to provide a vehicle air-conditioning apparatus in which an air volume distribution to the heat exchanger for cooling is adjusted even in the case where the vehicle air-conditioning apparatus employing the forced cooling structure is reduced in size.

The invention provides a vehicle air-conditioning apparatus comprising:
a blower unit, the blower unit including:
a scroll casing including a first wall having an intake port, a second wall facing the first wall, and a peripheral wall connecting peripheral edge portions of the first wall and the second wall; an impeller rotatably provided in the scroll casing; a motor having a revolving shaft configured to rotate the impeller and to be mounted on the second wall; a blow-out flow channel provided between a bending end portion of the scroll casing and a tongue portion of the scroll casing; a motor cooling air introduction chamber provided outside the tongue portion, wherein the motor cooling air introduction chamber is in communication with the blow-out flow channel via an air intake port opening in the peripheral wall of the tongue portion facing the blow-out flow channel at a position more closer to the first wall side than an inner wall surface of the second wall, and the blow-out flow channel is provided with at least one airflow regulating rib facing the peripheral wall provided with the air intake port, and the airflow regulating rib projects from an inner wall surface of the second wall and having a top portion in the blow-out flow channel.

In the vehicle air-conditioning apparatus of the invention, preferably, the rib arranged adjacent to the peripheral wall provided with the air intake port out of the airflow regulating ribs approaches the peripheral wall provided with the air intake port as it goes downstream. A larger quantity of blown air can be distributed to the portion of the heat exchanger for cooling far from the blow-out port of the scroll casing. Consequently, an air volume distribution of the blown air can be efficiently adjusted.

In the vehicle air-conditioning apparatus of the invention, preferably, the blow-out flow channel includes an enlarged portion gradually spread out in a direction along the revolving shaft at least as it goes downstream of the first wall, and an entire part or part of the airflow regulating rib is provided in an enlarged portion projection range, which is a range of the enlarged portion projected on the second wall along the revolving shaft. Since wind velocity is lowered in the enlarged portion, the quantity of the blown air to be supplied to a portion of the heat exchanger for cooling far from the blow-out port of the scroll casing tends to be reduced. However, with the provision of the airflow regulating rib, a larger amount of the blown air can be distributed to a portion of the heat exchanger for cooling far from the blow-out port of the scroll casing. Consequently, an air volume distribution of the blown air can be efficiently adjusted.

In the vehicle air-conditioning apparatus of the invention, preferably, the maximum height of the rib arranged adjacent to the peripheral wall provided with the air intake port out of the airflow regulating ribs is not higher than Hb+2 mm where Hb [mm] is a minimum height of an end portion of the air intake port on the second wall side. An increase in wind velocity of the blown air in the vicinity of the wall provided with the air intake port is prevented, and thus generation of noise can be reduced.

In the vehicle air-conditioning apparatus of the invention, preferably, the top portion of the airflow regulating rib approaches the second wall as it goes downstream. An increase in air-ventilation resistance can be prevented.

In the vehicle air-conditioning apparatus of the invention, preferably, a plurality of the airflow regulating ribs are arranged along an air flow, and the plurality of airflow regulating ribs are arranged in descending order according to the height from a peripheral wall side provided with the air intake port. With arrangement of the higher rib on the peripheral wall side provided with the air intake port, at which the wind velocity is relatively low, in the blow-out flow channel, a larger quantity of the blown air can be distributed to a portion of the heat exchanger for cooling far from the blow-out port of the scroll casing. Consequently, an air volume distribution of the blown air can be efficiently adjusted.

In the vehicle air-conditioning apparatus of the invention, preferably, the maximum height of the rib arranged adjacent to the peripheral wall provided with the air intake port out of the airflow regulating ribs is lower than the minimum height of the end portion of the air intake port on the second wall side and is not lower than Hb−10 mm where Hb [mm] is a minimum height of the end portion of the air intake port on the second wall side. With the maximum height of the rib lower than the minimum height of the end portion of the air intake port on the second wall side, the wind velocity of the blown air is reliably prevented from increasing in the vicinity of the peripheral wall provided with the air intake port, and thus generation of noise can be reduced. With the maximum height of the rib to be not lower than Hb−10 mm, the blown air can be further efficiently distributed to the portion of the heat exchanger for cooling far from the blow-out port of the scroll casing.

In the vehicle air-conditioning apparatus of the invention, preferably, a plurality of the airflow regulating ribs are arranged along the air flow, and the rib arranged at a position farthest from the peripheral wall provided with the air intake port out of the plurality of airflow regulating ribs has an area having a larger radius of curvature than the maximum radius of curvature of the rib adjacent to the peripheral wall provided with the air intake port. A larger quantity of airflow in the vicinity of a center of the blow-out flow channel can be distributed to the portion of the heat exchanger for cooling far from the blow-out port of the scroll casing. Consequently, an air volume distribution of the blown air can be efficiently adjusted.

In the vehicle air-conditioning apparatus of the invention, preferably, a plurality of the airflow regulating ribs or extended planes of the airflow regulating ribs intersect a blow-out plane formed by the blow-out port, which corresponds to a downstream end of the blow-out flow channel, and an angle on the peripheral wall side formed by the blow-out plane and the airflow regulating rib arranged at the farthest position from the peripheral wall provided with the air intake port or the extended plane thereof is larger than an angle on the peripheral wall side formed by the blow-out plane and the airflow regulating rib adjacent to the peripheral wall provided with the air intake port. A larger quantity of airflow in the vicinity of a center of the blow-out flow channel can be distributed to the portion of the heat exchanger for cooling far from the blow-out port of the scroll casing. Consequently, an air volume distribution of the blown air can be efficiently adjusted.

In the vehicle air-conditioning apparatus of the invention from between the plurality of airflow regulating ribs, the rib, which is arranged farther from the peripheral wall provided with the air intake port is preferably arranged so that the upstream end is positioned on the upstream side. A larger quantity of the air flow can be introduced to a portion between the rib arranged farther from the peripheral wall provided with the air intake port and the peripheral wall provided with the air intake port, and thus a larger quantity of the blown air can be distributed to a portion in the heat exchanger for cooling far from the blow-out port of the scroll casing. Consequently, an air volume distribution of the blown air can be efficiently adjusted.

The invention can provide a vehicle air-conditioning apparatus in which the air volume distribution to the heat exchanger for cooling is adjusted even in the case where the vehicle air-conditioning apparatus employing the forced cooling structure is reduced in size.

DETAIL DESCRIPTION OF INVENTION

Referring now to the attached drawings, a mode of the invention will be described. An embodiment described below is an example of the invention, and the invention is not limited to the following embodiment. In the specification and the drawings, components having identical reference signs are the same components. Various modifications may be made for achieving advantageous effects of the invention.

Figure 1:
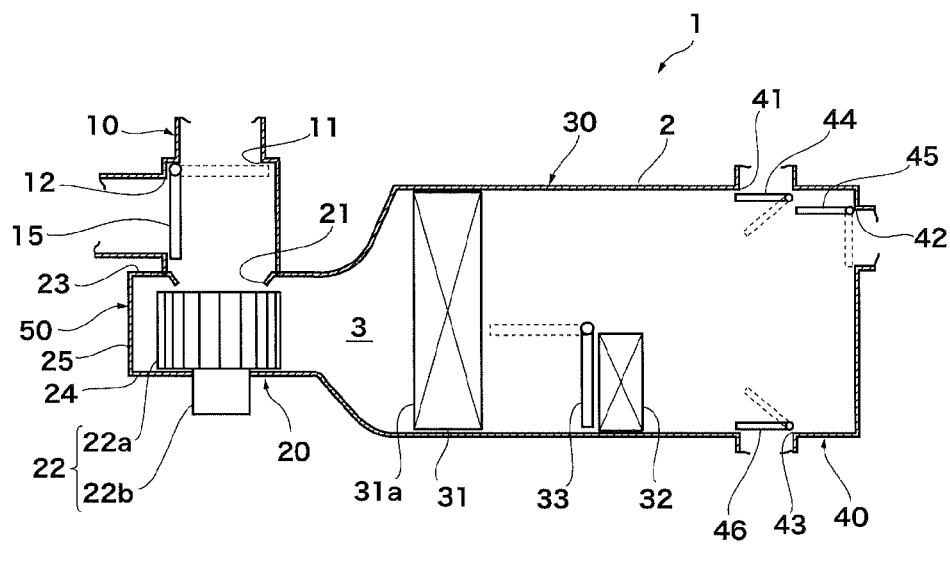
FIG. 1 is a schematic cross-sectional view of a vehicle air-conditioning apparatus according to an embodiment of the invention illustrating an example of the vehicle air-conditioning apparatus of the embodiment.
Figure 1:
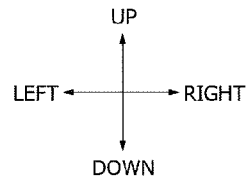
Figure 2:
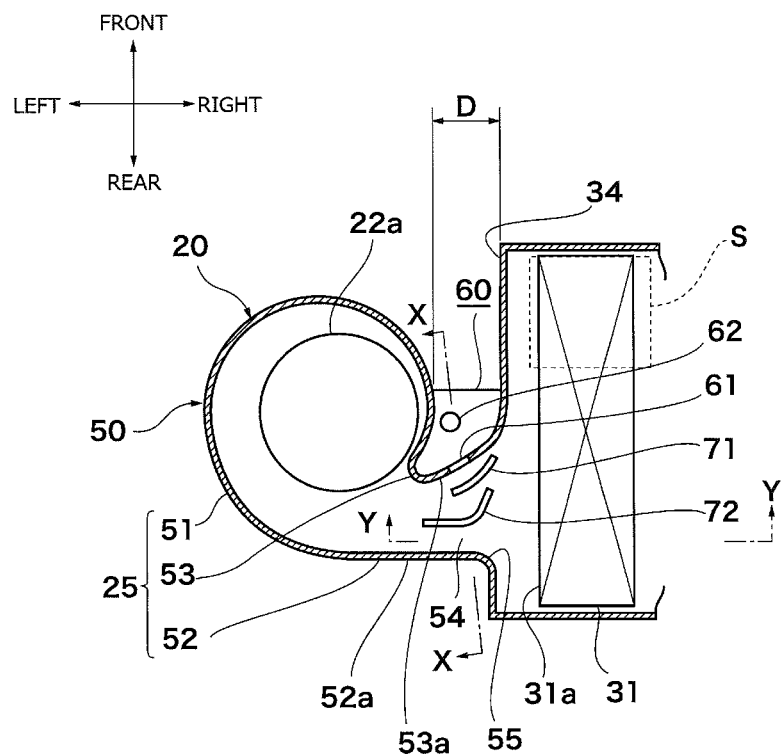
FIG. 2 is a partly enlarged cross-sectional view of a blower unit.
Figure 3:
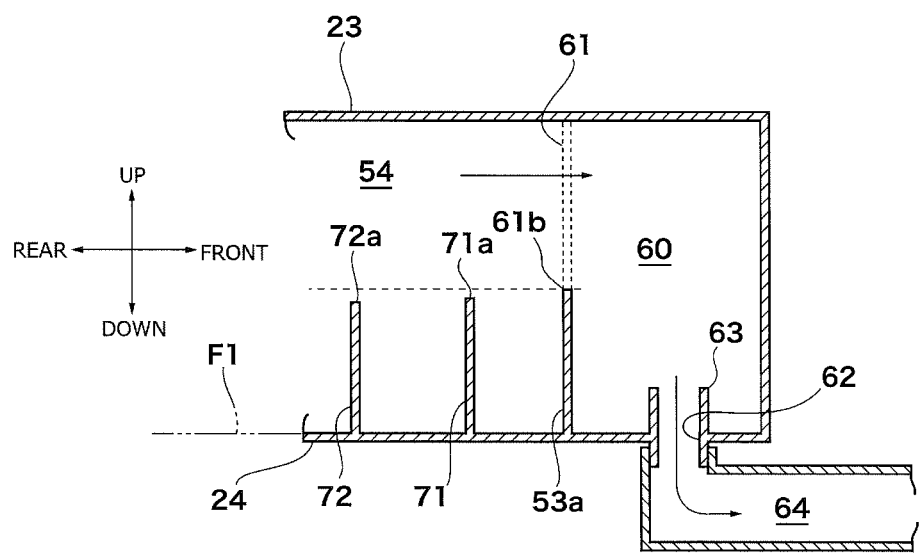
FIG. 3 is a cross-sectional view taken along a line X-X in FIG. 2.

The embodiment provides a vehicle air-conditioning apparatus 1 of the invention including: as illustrated in FIG. 1, a scroll casing 50 including a first wall 23 having an intake port 21, a second wall 24 facing the first wall 23, and a peripheral wall 25 connecting peripheral edge portions of the first wall 23 and the second wall 24, and a blower unit 20:

the blower unit 20 having: an impeller 22a rotatably provided in the scroll casing 50; a motor 22b having a revolving shaft configured to rotate the impeller 22a and to be mounted on the second wall 24; as illustrated in FIG. 2, a blow-out flow channel 54 provided between a bending end portion 52 of the scroll casing 50 and a tongue portion 53 of the scroll casing 50; and a motor cooling air introduction chamber 60 provided outside the tongue portion 53, wherein the motor cooling air introduction chamber 60 is, as illustrated in FIG. 3, in communication with the blow-out flow channel 54 via an air intake port 61 opening in the peripheral wall 53a of the tongue portion 53 facing the blow-out flow channel 54 at a position on the first wall 23 side with respect to an inner wall surface of the second wall 24, and the blow-out flow channel 54 is provided with at least one airflow regulating rib 71, 72 facing the peripheral wall 53a provided with the air intake port 61, and the airflow regulating rib 71, 72 projects from an inner wall surface of the second wall 24 and having a top portion 71a, 72a in the blow-out flow channel 54.

The vehicle air-conditioning apparatus 1 includes an intake portion 10, the blower unit 20, a temperature regulating unit 30, and an air distributing portion 40, and is formed integrally with a case 2 as illustrated in FIG. 1. For example, the vehicle air-conditioning apparatus 1 may be either a horizontal type having a layout in which the blower unit 20 and the temperature regulating unit 30 are arranged in the horizontal direction as illustrated in FIG. 1 or a vertical type having a layout in which the blower unit 20 and the temperature regulating unit 30 are arranged in the vertical direction (not illustrated). An internal space of the case 2 corresponds to an air channel 3.

The intake portion 10 includes an outside air introduction port 11 and an inside air introduction port 12 opened through the case 2 and an inside and outside air switching door 15 arranged in the case 2 as illustrated in FIG. 1.

The blower unit 20 includes a blower 22 in the interior of the scroll casing 50 as illustrated in FIG. 1. The blower 22 is arranged downstream of the intake portion 10. The blower 22 includes the impeller 22a and the motor 22b configured to drive the impeller 22a such as a sirocco fan or a turbo fan.

The temperature regulating unit 30 includes a heat exchanger for cooling 31 in the interior thereof as illustrated in FIG. 1. The heat exchanger for cooling 31 is arranged downstream of the blower 22 to form part of a refrigerating cycle (not illustrated) to allow refrigerant to circulate therein, thereby the blown air is cooled as needed. The temperature regulating unit 30 may include a heat exchanger for heating 32 and an air mixing door 33 arranged downstream of the heat exchanger for cooling 31. The heat exchanger for heating 32, for example, allows warm water warmed by waste heat of an engine, to pass therethrough, and heats the blown air as needed. The air mixing door 33 adjusts a percentage of air (cold air) bypassing the heat exchanger for heating 32 and a percentage of air (warm air) passing through the heat exchanger for heating 32.

The air distributing portion 40 includes a defrost opening 41, a ventilation opening 42, and a foot opening 43 as illustrated in FIG. 1. The defrost opening 41 is connected to a defrost blow-out port (not illustrated) in a cabin indirectly via a defrost duct (not illustrated) or directly. The ventilation opening 42 is connected to a ventilation blow-out port (not illustrated) in the cabin indirectly via a ventilation duct (not illustrated) or directly. The foot opening 43 is connected to a foot blow-out port (not illustrated) in the cabin indirectly via a foot duct (not illustrated) or directly. The blow-out ports (not illustrated) in the cabin blow out air regulated by the temperature regulating unit 30 toward the interior of the cabin. The opening degrees of the openings 41, 42, and 43 are adjusted by mode doors 44, 45, and 46, respectively.

The scroll casing 50 is part of the case 2. When the vehicle air-conditioning apparatus 1 is of a horizontal type as illustrated in FIG. 1, the first wall 23 is an upper wall and the second wall 24 is a lower wall. The intake port 21 is a bell mouth opening provided in the first wall 23. The peripheral wall 25 includes a peripheral wall 51 of a scroll portion surrounding the impeller 22a, a peripheral wall (peripheral wall facing the blow-out flow channel of the tongue portion 53) 53a connected to a beginning of bending of the peripheral wall 51 of the scroll portion and the bending end portion 52 connected to the bending end of the peripheral wall 51 of the scroll portion as illustrated in FIG. 2. The bending end portion 52 is a portion facing the tongue portion 53 of the peripheral wall 25, and includes a tangent portion 52a continuing from the bending end of the scroll casing 50.

As illustrated in FIG. 2, the blow-out flow channel 54 is a flow channel provided between the bending end portion 52 of the scroll casing 50 and the tongue portion 53 of the scroll casing 50, and is part of the air channel 3. A blow-out port 55 is an opening provided at a downstream end of the blow-out flow channel 54. The tongue portion 53 continues to an opposing wall 34 facing an intake surface 31a of the heat exchanger for cooling 31 via the peripheral wall 53a facing the blow-out flow channel 54.

The motor cooling air introduction chamber 60 is a space provided outside the tongue portion 53 as illustrated in FIG. 2. By the outside the tongue portion 53 is meant a side of the tongue portion 53 opposite to the blow-out flow channel 54 side. As illustrated in FIG. 2, the motor cooling air introduction chamber 60 may be formed by being surrounded by the peripheral wall 51 of the scroll portion and part of the peripheral wall 53a facing the blow-out flow channel of the tongue portion, and the opposing wall 34, or may be formed by being surrounded by the peripheral wall 51 of the scroll portion and part of the peripheral wall 53a of the tongue portion facing the blow-out flow channel (not illustrated). The motor cooling air introduction chamber 60 communicates with the blow-out flow channel 54 via the air intake port 61 provided in the peripheral wall 53a of the tongue portion 53 facing the blow-out flow channel 54 as illustrated in FIG. 3. An opening shape of the air intake port 61 is not specifically limited, and may be, for example, square, circle, oval, or other modified shapes thereof. An end portion (lower end in FIG. 3) 61b of the air intake port 61 on the second wall 24 side is located on the first wall 23 side with respect to the inner wall surface of the second wall 24. In the blow-out flow channel 54, the wind velocity becomes higher as it goes toward the second wall 24. In such a circumstance, if the air intake port 61 opens to an area reaching the inner wall surface of the second wall 24, an airflow at a high wind velocity is taken into the air intake port 61. Consequently, a problem of noise may occur by an interference of the airflow with the air intake port 61. Water contained in the airflow may enter the motor cooling air introduction chamber 60 and thus the interior of the motor may get wet.

The motor cooling air introduction chamber 60 has a cooling air introduction port 62 provided in the second wall 24. The cooling air introduction port 62 is preferably surrounded by a water-proof wall 63 projecting from the inner wall surface of the second wall 24. With the provision of the water-proof wall 63, entry of water in the interior of the motor 22b may be prevented. A duct 64 for introducing the cooling air which communicates with a housing of the motor 22b (illustrated in FIG. 1) is connected to the cooling air introduction port 62.

The forced cooling structure will be described briefly with reference to FIG. 3. Part of the airflow generated by rotation of the impeller 22a (illustrated in FIG. 1 and FIG. 2) is taken into the motor cooling air introduction chamber 60 from the air intake port 61, is fed from the cooling air introduction port 62 to the housing of the motor 22b (illustrated in FIG. 1) through the duct 64, and flows out into the interior of the scroll casing 50 via the interior of the housing. Consequently, the motor 22b is cooled.

As illustrated in FIG. 3, the airflow regulating ribs 71 and 72 are projections projecting from the inner wall surface of the second wall 24 toward the inside of the blow-out flow channel 54. The airflow regulating ribs 71 and 72 are preferably plate-shaped projections as illustrated in FIG. 2. By the plate shape is meant an elongated shape in plan view viewed from the top portions 71a and 72a side, and includes a mode in which both side surfaces are curved surfaces (illustrated in FIG. 2), a mode in which both side surfaces are flat surfaces (not illustrated), and a mode in which one of both side surfaces is a curved surface and the other side surface is a flat surface (not illustrated).

The airflow regulating ribs 71 and 72 may be formed integrally with the second wall 24 (illustrated in FIG. 3), or may be separate members from the second wall 24 (not illustrated). In the case where the airflow regulating ribs 71 and 72 are formed integrally with the second wall 24, the airflow regulating ribs 71 and 72 project directly from the inner wall surface of the second wall 24. When the airflow regulating ribs 71 and 72 are integral with the second wall 24, the airflow regulating ribs 71 and 72 preferably extend along the direction of separation of a die at the time of injection molding of the case 2. In the case where the airflow regulating ribs 71 and 72 are separate members from the second wall 24, molds (not illustrated) which form the airflow regulating ribs 71 and 72 are arranged on the inner wall surface of the second wall 24 and the airflow regulating ribs 71 and 72 project indirectly from the inner wall surface of the second wall 24.

At least one of the airflow regulating ribs 71 and 72 is essential, but provision of a plurality of the airflow regulating ribs 71 and 72 are more preferable. In FIG. 2 and FIG. 3, a mode in which two of the airflow regulating ribs 71 and 72 are provided is illustrated as an example.

The airflow regulating ribs 71 and 72 are arranged in the blow-out flow channel 54 so as to face the peripheral wall (the peripheral wall of the tongue portion facing the blow-out flow channel) 53a provided with the air intake port 61 as illustrated in FIG. 2. With the provision of the airflow regulating ribs 71 and 72, even when the vehicle air-conditioning apparatus is reduced in size, the blown air can be efficiently supplied to a portion of the heat exchanger for cooling 31 far from the blow-out port 55 of the scroll casing 50 (for example, an area S surrounded by a broken line in FIG. 2). By "the vehicle air-conditioning apparatus is reduced in size" is meant, for example, a mode in which a distance D between an outer wall surface of the scroll casing 50 and an outer wall surface of the opposing wall 34 facing the intake surface 31a of the heat exchanger for cooling 31 is reduced in comparison with those of general vehicle air-conditioning apparatuses. The distance D between the outer wall surface of the scroll casing 50 and the outer wall surface of the opposing wall 34 is 40 to 60 mm in general vehicle air-conditioning apparatuses. While in the vehicle air-conditioning apparatus of the embodiment, the distance D is preferably from 30 to 40 mm, and more preferably, from 33 to 37 mm.

At least one of the airflow regulating ribs 71 and 72 is preferably arranged so as to face the wall right below the air intake port 61. The blown air can be distributed further efficiently to the portion (area S illustrated in FIG. 2, for example) of the heat exchanger for cooling 31 far from the blow-out port 55 of the scroll casing 50. In FIG. 2, a mode in which the rib 71 arranged adjacent to the peripheral wall 53a provided with the air intake port is arranged so as to face the wall right below the air intake port 61 is illustrated as an example. However, a mode in which the rib 71 arranged adjacent to the peripheral wall 53a provided with the air intake port is shifted from the wall right below the air intake port 61 to the blower 22 side or to the heat exchanger for cooling 31 side, and the rib 72 arranged farther from the peripheral wall 53a provided with the air intake port is arranged so as to face the wall right below the air intake port 61 is also applicable.

The top portions 71a and 72a of the airflow regulating ribs 71 and 72 are located within the blow-out flow channel 54 as illustrated in FIG. 3. In other words, the top portions 71a and 72a of the airflow regulating ribs 71 and 72 are located on the second wall 24 side with respect to the inner wall surface of the first wall 23. When the top portions 71a and 72a of the airflow regulating ribs 71 and 72 reach the first wall 23, air resistance is increased too much and the maximum air volume intended by the vehicle air-conditioning apparatus 1 cannot be secured.

In the vehicle air-conditioning apparatus 1 of the embodiment, as illustrated in FIG. 3, a plurality of the airflow regulating ribs 71 and 72 are arranged along an airflow, and the plurality of airflow regulating ribs 71 and 72 are arranged preferably in descending order according to the height from the peripheral wall 53a side provided with the air intake port. With arrangement of the higher rib 71 on the peripheral wall 53a side provided with the air intake port, at which the wind velocity is relatively low, in the blow-out flow channel, a larger quantity of the blown air can be distributed to a portion (area S illustrated in FIG. 2, for example) of the heat exchanger for cooling 31 far from the blow-out port of the scroll casing 50. Consequently, an air volume distribution of the blown air can be efficiently adjusted. The height of the airflow regulating rib 71 corresponds to a height with reference to an virtual plane F1 which is a plane orthogonal to a direction of the revolving shaft (vertical direction in FIG. 3) of the impeller 22a (illustrated in FIG. 1) and comes into contact with a portion of the second wall 24 farthest from the first wall 23. FIG. 2 illustrates a case where the second wall 24 and the virtual plane F1 are parallel to each other.

The height of the airflow regulating ribs 71 and 72 may be constant in the longitudinal direction or may vary in a longitudinal direction. In the case where the height of the airflow regulating ribs 71 and 72 is varied in the longitudinal direction, for example, the top portions 71a and 72a of the airflow regulating ribs 71 and 72 may be brought closer to the second wall 24 as they go downstream, or the top portions 71a and 72a of the airflow regulating ribs 71 and 72 may be brought closer to the first wall 23 as they go downstream. In the vehicle air-conditioning apparatus 1 of the embodiment, further preferably, the top portions 71a and 72a of the airflow regulating ribs 71 and 72 approach the second wall 24 as they go downstream. An increase in air-ventilation resistance can be prevented.

Figure 4:
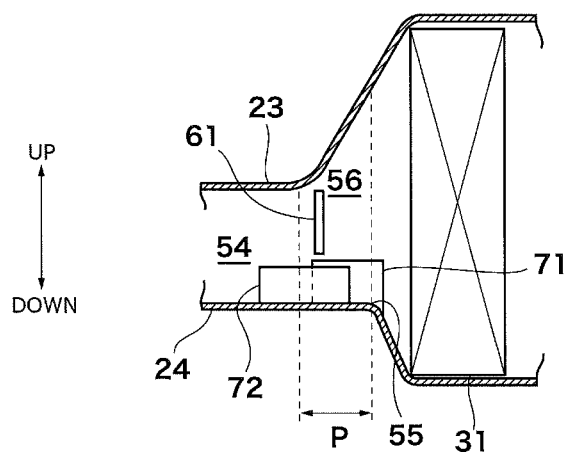
FIG. 4 is a cross-sectional view taken along a line Y-Y in FIG. 2.

FIG. 4 is a cross-sectional view taken along a line Y-Y in FIG. 2. In the vehicle air-conditioning apparatus 1 of the embodiment, the blow-out flow channel 54 includes an enlarged portion 56 gradually spread out in a direction (upward in FIG. 4) along the revolving shaft as it goes downstream of the first wall 23, and the entire part or part of the airflow regulating ribs 71 and 72 is preferably provided in an enlarged portion projection range P which is the enlarged portion 56 projected on the second wall 24 along the revolving shaft. Since wind velocity is lowered in the enlarged portion 56, the quantity of air to be supplied to a portion (area S illustrated in FIG. 2, for example) of the heat exchanger for cooling 31 far from the blow-out port 55 of the scroll casing 50 tends to be reduced. However, with the provision of the airflow regulating ribs 71 and 72, a larger amount of blown air can be distributed to a portion of the heat exchanger for cooling 31 far from the blow-out port 55 of the scroll casing 50. Consequently, an air volume distribution of the blown air can be efficiently adjusted. The enlarged portion 56 corresponds to a portion from a beginning of spread of the first wall 23 to the blow-out port 55. In FIG. 4, although the rib 71 arranged adjacent to the peripheral wall 53a provided with the air intake port enters within the enlarged portion projection range P in most part thereof, part on the downstream side thereof is out of the enlarged portion projection range P. Although the rib 72 arranged farther from the peripheral wall 53a provided with the air intake port enters within the enlarged portion projection range P in downstream side portion thereof, part on the upstream side thereof is out of the enlarged portion projection range P. The invention is not limited to the arrangement of the ribs 71 and 72, and the entire parts of the ribs 71 and 72 may be arranged within the enlarged portion projection range P, for example. In FIG. 4, a mode of the enlarged portion 56 in which only the first wall 23 is gradually spread out in the direction along the revolving shaft (upward in FIG. 4) is illustrated. However, the invention is not limited thereto, and the second wall 24 in addition to the first wall 23 in the enlarged portion 56 may be gradually spread out in the direction along the revolving shaft (downward in FIG. 4).

Figure 5A:
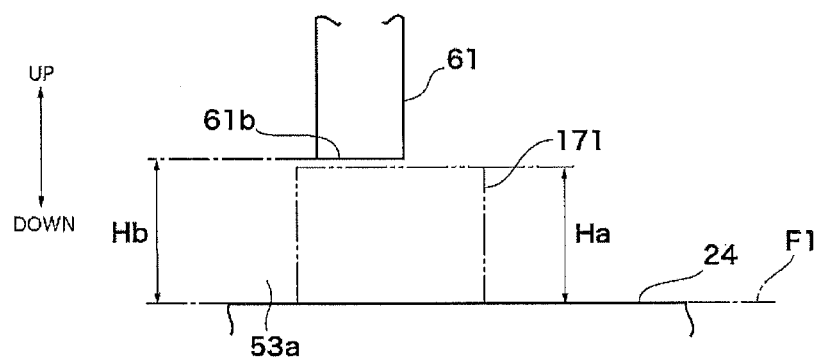
FIG. 5A is a drawing of projection of an airflow regulating rib arranged adjacent to a peripheral wall provided with an air intake port on the peripheral wall illustrating a mode in which the height of the rib is constant in a longitudinal direction.
Figure 5B:
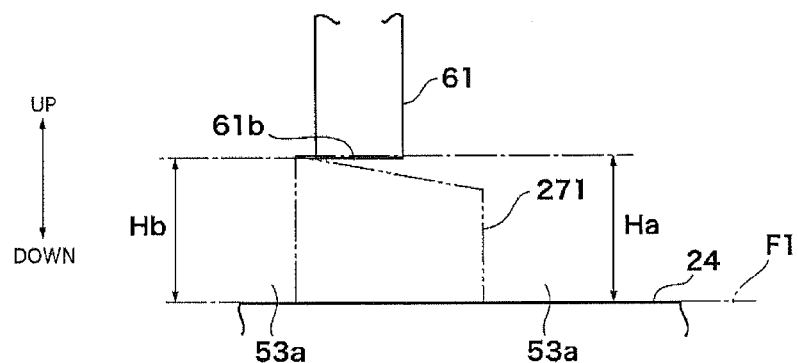
FIG. 5B is a drawing of projection of an airflow regulating rib arranged adjacent to the peripheral wall provided with the air intake port on the peripheral wall illustrating a mode in which the height of the rib varies in the longitudinal direction.

FIG. 5A is a drawing of projection of the airflow regulating ribs arranged adjacent to the peripheral wall 53a provided with the air intake port on the peripheral wall, illustrating a mode in which the height of the ribs is constant in the longitudinal direction, and FIG. 5B is a drawing of projection of the airflow regulating ribs arranged adjacent to the peripheral wall 53a provided with the air intake port on the peripheral wall, illustrating a mode in which the height of the ribs varies in the longitudinal direction. In FIGS. 5A and 5B, reference numerals 171 and 271 denote projection planes on which the airflow regulating rib 71 as illustrated in FIG. 2 is projected on the peripheral wall 53a provided with the air intake port. In the vehicle air-conditioning apparatus 1 of the embodiment, preferably, the maximum height Ha of the rib 71 (illustrated in FIG. 2) arranged adjacent to the peripheral wall 53a provided with the air intake port out of the airflow regulating ribs is not higher than Hb+2 mm where the minimum height Hb of the end portion 61b of the air intake port 61 on the second wall 24 side is Hb [mm]. Originally, the area of the blow-out flow channel 54 in proximity to the peripheral wall 53a provided with the air intake port 61 is a portion which is not susceptible to an impact of a dynamic pressure of air blown out from the blower 22, and thus probability of generation of noise caused by interference of airflow with the air intake port 61 is low. However, in this embodiment, with the provision of the airflow regulating rib 71 in the vicinity of the peripheral wall 53a provided with the air intake port, the area in proximity to the peripheral wall 53a may become susceptible to an impact of the dynamic pressure. Therefore, by reducing or eliminating the range of the projection planes 171 and 271 on the peripheral wall 53a on which the rib 71 is projected that overlaps with the air intake port 61, an increase in wind velocity of the blown air in the vicinity of the peripheral wall 53a provided with the air intake port 61 is prevented, and thus the generation of noise can be reduced. Now, the maximum height Ha of the airflow regulating rib 71 corresponds to the maximum value of the height with reference to the virtual plane F1 which is a plane orthogonal to a direction of the revolving shaft (vertical direction in FIG. 3) of the impeller 22a (illustrated in FIG. 1) and comes into contact with a portion of the second wall 24 farthest from the first wall 23. The minimum height Hb of the end portion on the second wall 24 side of the air intake port 61 corresponds to the minimum value of the height with reference to the virtual plane F1.

In the vehicle air-conditioning apparatus 1 of the embodiment, preferably, the maximum height Ha of the rib 71 (illustrated in FIG. 2) arranged adjacent to the peripheral wall 53a provided with the air intake port out of the airflow regulating ribs is lower than the minimum height Hb of the end portion 61b of the air intake port 61 on the second wall 24 side and not smaller than Hb−10 mm as illustrated in FIG. 5A. With the maximum height Ha of the rib 71 set to be lower than Hb, the wind velocity of the blown air is reliably prevented from increasing in the vicinity of the peripheral wall 53a provided with the air intake port, and thus generation of noise can be reduced. With the maximum height Ha of the rib 71 to be not lower than Hb−10 mm, a larger quantity of the blown air can be efficiently distributed to the portion of the heat exchanger for cooling 31 far from the blow-out port 55 of the scroll casing 50 (the area S illustrated in FIG. 2, for example). The maximum height Ha of the rib 71 is further preferably not lower than Hb−5 mm.

As illustrated in FIG. 5A and FIG. 5B, preferably, the projection planes 171 and 271 on the peripheral wall 53a on which the rib 71 arranged at a position adjacent to the peripheral wall 53a provided with the air intake port is projected do not overlap with the air intake port 61. In FIG. 5A, the maximum height Ha of the rib is lower than the minimum height Hb of the end portion of the air intake port 61 on the second wall 24 side, and the projection plane 171 on the peripheral wall 53a on which the rib is projected does not overlap with the air intake port 61. In FIG. 5B, the maximum height Ha of the rib is higher than the minimum height Hb of the end portion of the air intake port 61 on the second wall 24 side, and the projection plane 271 on the peripheral wall 53a on which the rib is projected does not overlap with the air intake port 61. In this manner, by preventing the projection planes 171 and 271 on the peripheral wall 53a on which the rib 71 is projected from overlapping with the air intake port 61, reduction of noise can be further ensured.

Figure 6:
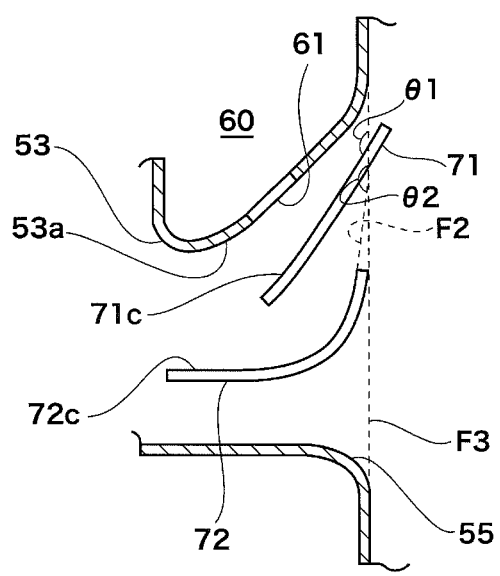
FIG. 6 is a partial enlarged cross-sectional view of a blow-out flow channel.

FIG. 6 is a partially enlarged cross-sectional view of the blow-out flow channel 54. In the vehicle air-conditioning apparatus 1 of the embodiment, preferably, the rib 71 arranged adjacent to the peripheral wall 53a provided with the air intake port out of the airflow regulating ribs 71 and 72 approaches the peripheral wall 53a provided with the air intake port as it goes downstream. Blown air can be distributed to the portion (area S illustrated in FIG. 2, for example) of the heat exchanger for cooling 31 far from the blow-out port 55 of the scroll casing 50 by a larger amount. Consequently, an air volume distribution of the blown air can be efficiently adjusted.

In the vehicle air-conditioning apparatus 1 of the embodiment, preferably, a plurality of the airflow regulating ribs 71 and 72 are arranged along the air flow, and the rib 72 arranged at a position farthest from the peripheral wall 53a provided with the air intake port out of the plurality of airflow regulating ribs 71 and 72 has an area having a larger radius of curvature than the maximum radius of curvature of the rib 71 adjacent to the peripheral wall 53a provided with the air intake port as illustrated in FIG. 6. A larger quantity of airflow in the vicinity of a center of the blow-out flow channel 54 can be distributed to the portion (area S illustrated in FIG. 2, for example) of the heat exchanger for cooling 31 farther from the blow-out port 55 of the scroll casing 50. Consequently, an air volume distribution of the blown air can be efficiently adjusted.

In the vehicle air-conditioning apparatus of the embodiment, as illustrated in FIG. 6, preferably, the airflow regulating ribs 71 or an extending plane F2 of the airflow regulating rib 72 intersects a blow-out plane F3 formed by the blow-out port 55 at the downstream end of the blow-out flow channel 54, and angles θ1 and θ2 on the peripheral wall 53a side provided with the air intake port out of angles formed between the blow-out plane F3 and the airflow regulating rib 71 and the airflow regulating rib 72 or the extending plane F2 thereof are set in such a manner that the angle θ2 defined by the rib 72 arranged at a position farthest from the peripheral wall 53a provided with the air intake port is larger than the angle θ1 defined by the rib 71 provided at a position adjacent to the peripheral wall 53a provided with the air intake port. By the angles θ1, θ2 are meant angles formed between side surfaces 71c and 72c of the side surfaces of the airflow regulating ribs 71 and 72 on the peripheral wall 53a side provided with the air intake port or the extending plane F2 on the side surfaces 71c and 72c and the blow-out plane F3. In FIG. 6, the rib 71 adjacent to the peripheral wall 53a provided with the air intake port intersects the blow-out plane F3 at an angle of θ1. The extending plane F2 of the rib 72 arranged at a position farthest from the peripheral wall 53a provided with the air intake port intersects the blow-out plane F3 at an angle of θ2. With the relationship that θ1 is larger than θ2, a larger quantity of airflow in the vicinity of a center of the blow-out flow channel 54 can be distributed to the portion (area S illustrated in FIG. 2, for example) farther from the blow-out port 55 of the scroll casing 50 in the heat exchanger for cooling 31. Consequently, an air volume distribution of the blown air can be efficiently adjusted.

In the vehicle air-conditioning apparatus of the embodiment, as illustrated in FIG. 6, from between the plurality of airflow regulating ribs 71 and 72, the rib 71, which is arranged nearer to the peripheral wall 53a provided with the air intake port is preferably arranged so that the downstream end is positioned on the downstream side. Blown air can be distributed to the portion (area S illustrated in FIG. 2, for example) of the heat exchanger for cooling 31 far from the blow-out port 55 of the scroll casing 50 by a larger amount. Consequently, an air volume distribution of the blown air can be efficiently adjusted. Here, by the downstream end is meant one of contact points between side surfaces 71c and 72c on the peripheral wall 53a side provided with the air intake port from among the side surfaces of the airflow regulating ribs 71 and 72 and the second wall (the wall located in a direction of the depth of the paper plane in FIG. 6), which is located on the downstream side in plan view of the airflow regulating ribs 71 and 72 viewing from the direction of the top portions 71a and 72a.

In the vehicle air-conditioning apparatus of the embodiment, as illustrated in FIG. 6, from between the plurality of airflow regulating ribs 71 and 72, the rib 72, which is arranged farther from the peripheral wall 53a provided with the air intake port is preferably arranged so that the upstream end is positioned on the upstream side. A larger quantity of the airflow can be introduced to a portion between the rib 72 arranged far from the peripheral wall 53a provided with the air intake port and the peripheral wall 53a provided with the air intake port, and thus a larger quantity of the blown air can be distributed to a portion (area S illustrated in FIG. 2, for example) in the heat exchanger for cooling 31 far from the blow-out port 55 of the scroll casing 50. Consequently, an air volume distribution of the blown air can be efficiently adjusted. Here, by the upstream end is meant an upstream side contact point out of contact points between side surfaces 71c and 72c of the airflow regulating ribs 71 and 72 on the peripheral wall 53a side provided with the air intake port in plan view of the airflow regulating ribs 71 and 72 viewed from the direction of top portions 71a and 72a side and the second wall (the wall located in the direction of the depth of the paper plane in FIG. 6).

EXAMPLE

Although the invention will be described further in detail on the basis of the examples, the invention is not limited to these examples.

A noise test was conducted on the vehicle air-conditioning apparatus provided with the blower unit illustrated in FIG. 2 to FIG. 4 as Example 1. In the noise test, the vehicle air-conditioning apparatus was operated with an intake air mode set to internal air circulation, a mixing door at a full cool position, an air blow-out mode in a ventilation mode, a blowing volume of the blower 22 of 350 m³/h, and a sound pressure level (SPL) was measured by installing a microphone at a position near a passenger's face (a position 1 m apart from the vehicle air-conditioning apparatus 1 at an upward angle of 45 degrees). As Comparative Example 1, the same test was conducted by using the vehicle air-conditioning apparatus having the same configuration as that in Example 1 except for a configuration in which the air intake port is opened up to the inner wall surface of the second wall 24. A result of Evaluation will be illustrated in FIG. 7.

Figure 7:
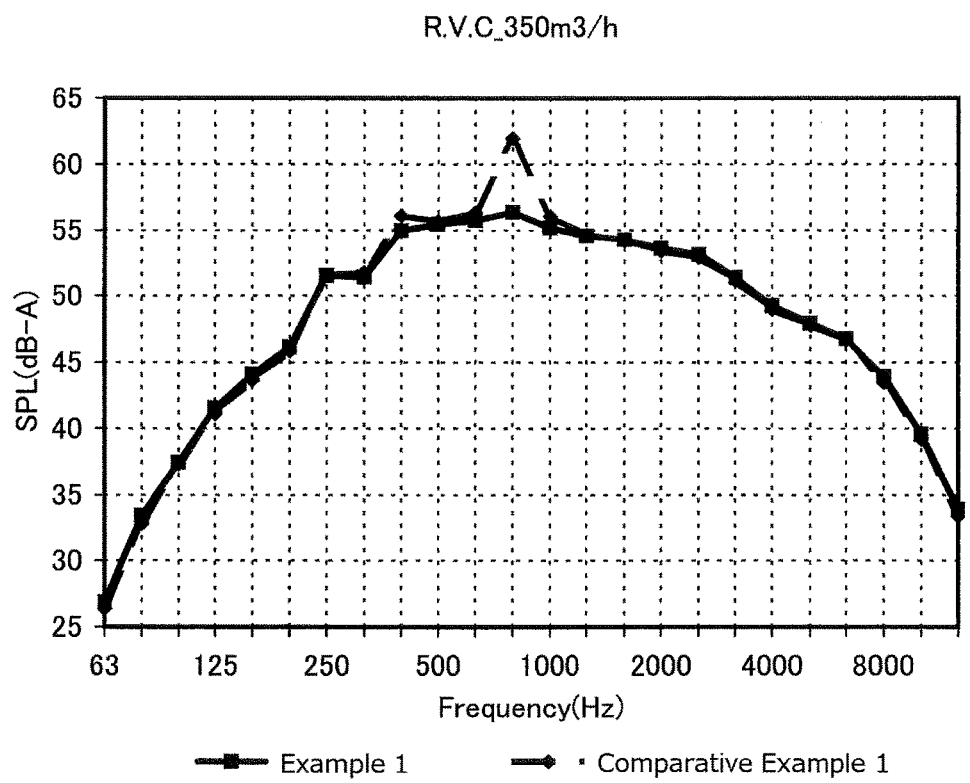
FIG. 7 is a drawing illustrating a result of a noise evaluation.

As illustrated in FIG. 7, the sound pressure level showed a local rise at a frequency around 800 Hz in the vehicle air-conditioning apparatus of Comparative Example 1, while the sound pressure level did not show a local rise in the vehicle air-conditioning apparatus of Example 1. The vehicle air-conditioning apparatus of Example 1 produced wind noise lower than that in the vehicle air-conditioning apparatus of Comparative Example 1, and it was confirmed that noise has reduced.

REFERENCE SIGNS LIST

1: vehicle air-conditioning apparatus
2: case
3: air channel
10: intake portion
11: outside air introduction port
12: inside air introduction port
15: inside and outside air switching door
20: blower unit
21: intake port
22: blower
22a: impeller
22b: motor
23: first wall
24: second wall
25: peripheral wall
30: temperature regulating unit
31: heat exchanger for cooling
31a: intake surface of heat exchanger for cooling
32: heat exchanger for heating
33: air mixing door
34: opposing wall
40: air distributing portion
41: defrost opening
42: ventilation opening
43: foot opening
44, 45, 46: mode door
50: scroll casing
51: peripheral wall of scroll portion
52: bending end portion
52a: tangent portion
53: tongue portion
53a: peripheral wall provided with air intake port (peripheral wall of tongue portion facing blow-out flow channel)
54: blow-out flow channel
55: blow-out port
56: enlarged portion
60: motor cooling air introduction chamber
61: air intake port
61b: end portion of the air intake port on the second wall side
62: cooling air introduction port
63: water-proof wall
64: duct for introducing cooling air
71, 72: airflow regulating rib
71a, 72a: top portion
71c, 72c: side surface
171, 271: projection plane D: distance between outer wall surface of scroll casing and outer wall surface of opposing wall
F1: virtual plane
F2: extended plane
F3: blow-out plane
Ha: maximum height of rib arranged adjacent to peripheral wall provided with air intake port
Hb: minimum height of end portion of air intake port on the second wall side
P: enlarged portion projection range
S: area

What is claimed is:

1. A vehicle air-conditioning apparatus comprising:
a blower unit, the blower unit including:
a scroll casing including a first wall having an intake port; a second wall facing the first wall; and a peripheral wall connecting peripheral edge portions of the first wall and the second wall, and
an impeller rotatably provided in the scroll casing;
a motor having a revolving shaft configured to rotate the impeller and to be mounted on the second wall;
a blow-out flow channel provided between a bending end portion of the scroll casing and a tongue portion of the scroll casing; and
a motor cooling air introduction chamber provided outside the tongue portion, wherein:
the motor cooling air introduction chamber is in communication with the blow-out flow channel via an air intake port opening in a peripheral wall of the tongue portion facing the blow-out flow channel at a position more closer to the first wall side than an inner wall surface of the second wall,
the blow-out flow channel is provided with a plurality of airflow regulating ribs comprising a first rib and a second rib intersecting a blow-out plane formed by a blow-out port and facing the peripheral wall provided with the air intake port,
the plurality of airflow regulating ribs projects from an inner wall surface of the second wall and having a top portion in the blow-out flow channel, and
the plurality of airflow regulating ribs are arranged so that an upstream end of the first rib among the plurality of airflow regulating ribs is arranged at a position farther from the peripheral wall than a downstream end of the first rib provided the air intake port is located on the upstream side, the first rib approaching the peripheral wall from the upstream end to the downstream end,
wherein the first rib defines a first angle with the blow-out plane and the second rib defines a second angle with the blow-out plane, and
wherein the first angle is greater than the second angle.

2. The vehicle air-conditioning apparatus according to claim 1, wherein
the blow-out flow channel includes an enlarged portion gradually spread out in a direction along the revolving shaft at least as the first rib goes downstream of the first wall, and
an entire part or part of the plurality of airflow regulating ribs is provided in an enlarged portion projection range, which is an area of the enlarged portion projected on the second wall along the revolving shaft.

3. The vehicle air-conditioning apparatus according to claim 1, wherein
a maximum height of a rib arranged adjacent to the peripheral wall (53a) provided with the air intake port out of the plurality of airflow regulating ribs is not higher than Hb+2 mm where Hb [mm] is a minimum height of an end portion of the air intake port on the second wall side.

4. The vehicle air-conditioning apparatus according to claim 1, wherein the top portions of the plurality of airflow regulating ribs approach the second wall as they go downward.

5. The vehicle air-conditioning apparatus according to claim 1, wherein the plurality of airflow regulating ribs are arranged along an air flow, and the plurality of airflow regulating ribs are arranged in descending order according to the height from a peripheral wall side provided with the air intake port.

6. The vehicle air-conditioning apparatus according to claim 1, wherein the maximum height of the rib arranged adjacent to the peripheral wall provided with the air intake port out of the plurality of airflow regulating ribs is lower than the minimum height of the end portion of the air intake port on the second wall side and is not lower than Hb−10 mm where Hb [mm] is the minimum height of the end portion of the air intake port on the second wall side.

7. The vehicle air-conditioning apparatus according to claim 1, wherein the plurality of airflow regulating ribs are arranged along the air flow, and a rib arranged at a position farthest from the peripheral wall provided with the air intake port out of the plurality of the airflow regulating ribs has an area having a larger radius of curvature than a maximum radius of curvature of the rib adjacent to the peripheral wall provided with the air intake port.

8. The vehicle air-conditioning apparatus according to claim 1, wherein the plurality of airflow regulating ribs are arranged so that a downstream end of the second rib is arranged at a position nearer to the peripheral wall than an upstream end of the second rib provided the air intake port is located on a downstream side.

* * * * *